United States Patent [19]

Hamane et al.

[11] 4,387,606
[45] Jun. 14, 1983

[54] AUTOMATIC TRANSMISSION

[75] Inventors: Masumi Hamane, Kawagoe; Akira Shigihara, Asaka; Masaie Kato, Musashino, all of Japan

[73] Assignee: Honda Giken Kogyo Kabushiki Kaisha, Tokyo, Japan

[21] Appl. No.: 149,929

[22] Filed: May 14, 1980

[30] Foreign Application Priority Data

May 18, 1979 [JP] Japan .................................. 54-61752
Jul. 6, 1979 [JP] Japan .................................. 54-86072

[51] Int. Cl.³ ............................................. F16H 3/74
[52] U.S. Cl. ................................ 74/752 E; 74/781 R
[58] Field of Search ................... 74/752 E, 781 R, 411

[56] References Cited

U.S. PATENT DOCUMENTS 2,470,241  5/1949  Diard ................................ 74/752 E
2,590,635  3/1952  McAlister ......................... 74/752 E

*Primary Examiner*—Kenneth Dorner
*Attorney, Agent, or Firm*—Armstrong, Nikaido, Marmelstein & Kubovcik

[57] ABSTRACT

An improved automatic transmission is disclosed which includes a planetary gear mechanism and a wet type centrifugally operated clutch for controlling power transmission from a rotating input member to an output member. The clutch is connected to the input member for integral rotation therewith and disposed in a casing at a location close to the planetary gear mechanism. A drive chain for transmitting power from the output member to a driven member is disposed in the casing at a location close to the planetary gear mechanism on the opposite side of the clutch. One or both of the clutch and the chain is/are immersed in a lubricating oil sealingly contained in the casing so that the lubricating oil is scooped up by means of the clutch or chain in accordance with the rotation of the input member so as to be supplied to the planetary gear mechanism.

6 Claims, 8 Drawing Figures

FIG. 4
FIG. 3
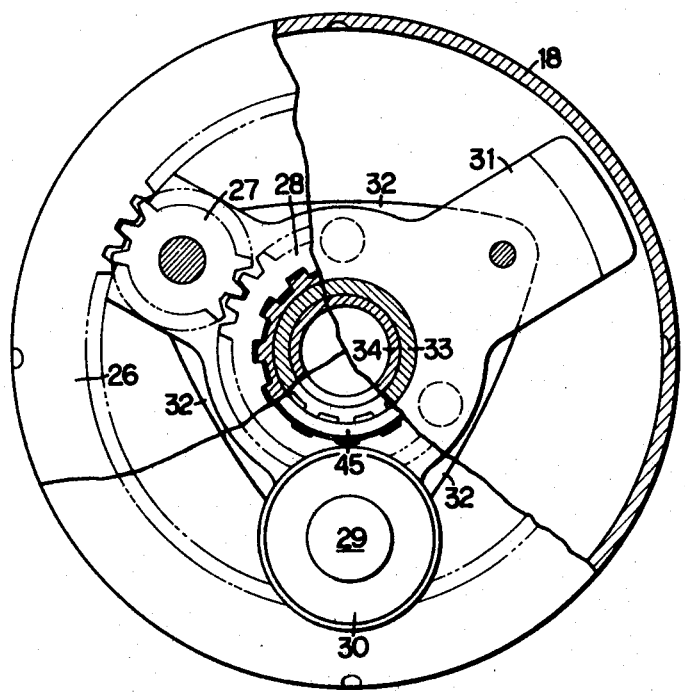
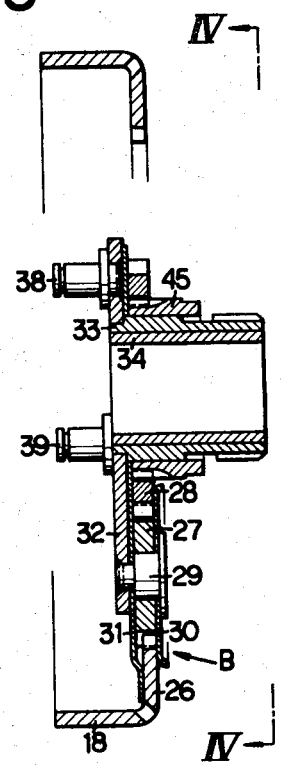
FIG. 5
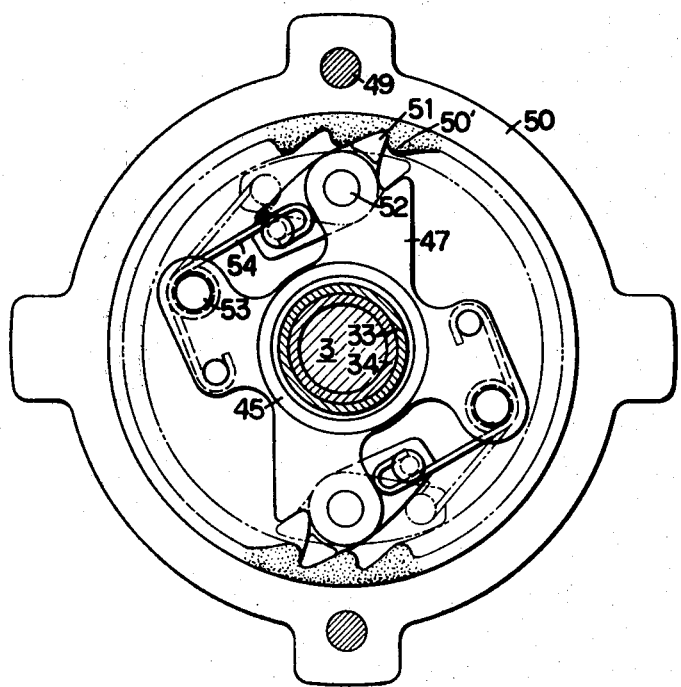

AUTOMATIC TRANSMISSION

BACKGROUND OF THE INVENTION

1. Field of the Invention

The present invention relates to an automatic transmission comprising an input member operatively connected to a drive source, such as a motor so as to be rotated thereby, an output member operatively connected to a driven member, a planetary gear mechanism disposed between the input and output members for transmitting power from the input member to the output member, and a centrifugally operated clutch for controlling the transmission of power between the planetary gear mechanism and the input and output members.

2. Description of the Prior Art p A planetary gear mechanism in general has gears rotating at varying speeds ranging from a low speed to a high speed, and requires a cooling means whereby frictional heat generated in meshing portions and bearing-contacting portions of these gears is absorbed to prevent seizure and deterioration of the gears. A planetary gear mechanism also requires a lubricating means for preventing the gears from being hurt or worn, and for promoting a smooth meshing and rotation of the gears to prevent a decrease in the power transmission efficiency.

A planetary gear mechanism further requires in many cases a means for minimizing the generation of noises. When a planetary gear mechanism provided with a cooling means, a lubricating means and an additional noise prevention means is installed, especially, in an automatic transmission, the construction of the automatic transmission necessarily becomes very complicated. This causes various kinds of inconveniences. Namely, it becomes necessary that the dimensions of the automatic transmission and the number of steps of manufacturing the same be increased.

In a dry type centrifugally operated clutch in general, the coefficient of friction of a lining material for a frictionally contacting portion thereof is higher than that in a wet type clutch. Therefore, in order to obtain the same clutch capacity when the clutch is rotated in a direction in which a leading effect is produced, a comparatively light, centrifugally operated weight may be satisfactorily used. However, in order to attain a stable clutch operation without accompanying a decrease in coefficient of friction of the frictionally contacting portion, it is necessary that the surface of the lining material be maintained in a perfectly dried state.

In a case where a planetary gear mechanism and a dry type centrifugally operated clutch in an automatic transmission are housed in the same casing, it is necessary that a partition wall be provided between the planetary gear mechanism and the centrifugally operated clutch for the purpose of preventing a liquid, such as a lubricating oil, which has been supplied to the planetary gear mechanism, from being deposited on the surface of a lining material for the frictionally contacting portion of the centrifugally operated clutch.

On a frictionally contacting portion of a centrifugally operated clutch, frictional heat is generated during an operation thereof. Consequently, when a dry type centrioperated clutch is employed, it is necessary that a device for absorbing the generated frictional heat be additionally provided.

SUMMARY OF THE INVENTION

Therefore, an object of the present invention is to provide an improved automatic transmission of the type having a planetary gear mechanism and a centrifugally operated clutch, which employs no special cooling means for the planetary gear mechanism and the centrifugally operated clutch, no special lubricating means for the planetary gear mechanism, and no partition wall between the planetary gear mechanism and the centrifugally operated clutch; and which is simple in construction, extremely low in noise level and excellent in power transmission efficiency.

To achieve the above object, the present invention provides, according to one aspect of the invention, an automatic transmission comprising a casing containing a lubricating oil sealed therein, an input member operatively connected to a drive source so as to be rotated thereby, an output member operatively connected to a driven member, a planetary gear mechanism interposed in said casing between said input member and said output member for transmitting power from said input member to said output member, and a wet type centrifugally operated clutch means cooperating with said planetary gear mechanism to form a power transmission passage for controlling power transmission between said planetary gear mechanism and said input and output members, said clutch means being connected to said input member in said casing at a location close to said planetary gear mechanism and having at least a part thereof immersed in the lubricating oil in said casing whereby the lubricating oil is scooped up by said clutch means in accordance with the rotation of said input member so as to be supplied to said planetary gear mechanism.

According to another aspect of the invention, there is provided an automatic transmission comprising a casing containing a lubricating oil sealed therein, an input member operatively connected to a drive source so as to be rotated thereby, an output member operatively connected to a driven member, a planetary gear mechanism interposed in said casing between said input member and said output member for transmitting power from said input member to said output member, a wet type centrifugally operated clutch means cooperating with said planetary gear mechanism to form a power transmission passage for controlling power transmission between said planetary gear mechanism and said input and output members, and a drive chain transmitting power from said output member to said driven member, said drive chain being sealingly disposed in said casing at a location close to said planetary gear mechanism and having at least a part thereof immersed in the lubricating oil in said casing whereby the lubricating oil is scooped up by said drive chain in accordance with the rotation of said input member so as to be supplied to said planetary gear mechanism.

The above and other objects as well as characteristic features of the invention will become apparent from the following description of the invention when taken in conjunction with the accompanying drawings which illustrate a few presently preferred embodiments of the invention.

BRIEF DESCRIPTION OF THE DRAWINGS:

FIG. 3 is a longitudinal sectional view of a principal portion of the embodiment shown in FIG. 1;

FIG. 4 is a side elevational view partially in section taken along the line IV—IV in FIG. 3;

FIG. 5 is a cross-sectional view taken along the line V—V in FIG. 1;

DESCRIPTION OF THE PREFERRED EMBODIMENTS

An embodiment of the present invention applied to a drive means in a small motorcycle will be described with reference to the accompanying drawings.

Figure 1:
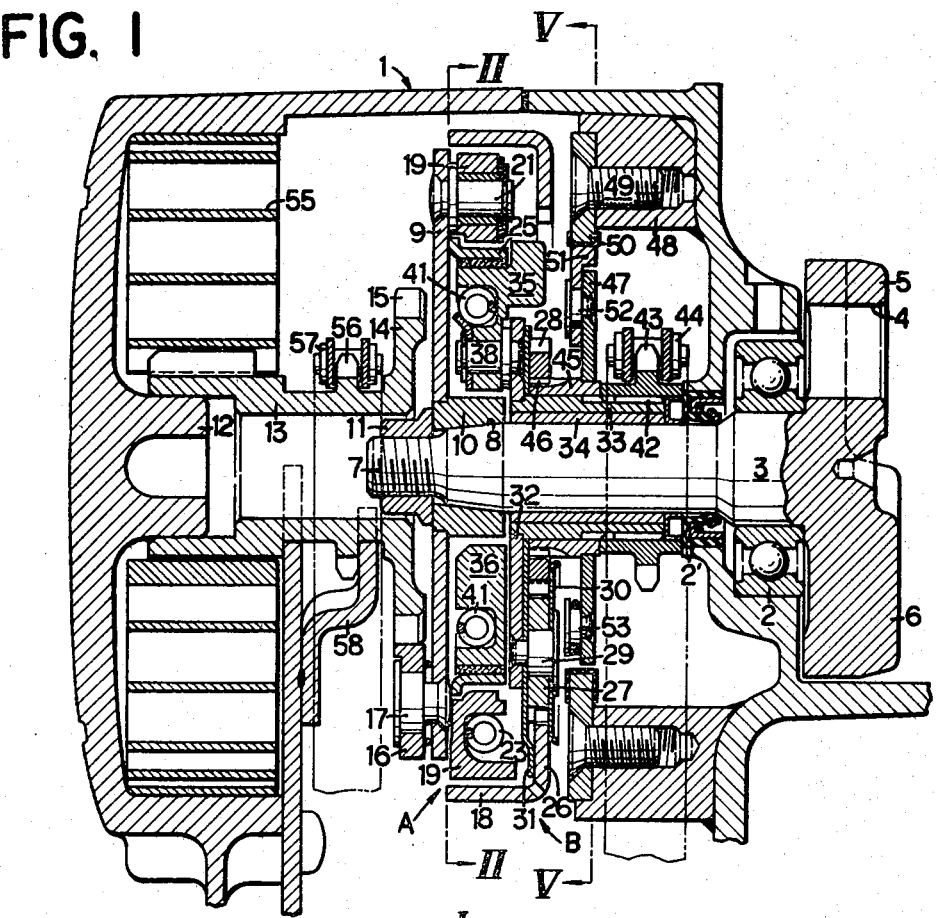
FIG. 1 is a longitudinal sectional view, taken along the line I—I in FIG. 2, of a lubricating means in an automatic transmission for vehicles embodying the present invention, applied to a drive means in a small motorcycle.

Referring to FIG. 1, an input member or a drive shaft 3 is provided via bearings 2 and a seal member 2' in a casing 1 which contains a lubricating oil sealed therein.

A crank arm 5 having a crank pin supporting bore 4, and a counter weight 6 are provided at the inner end portion of the drive shaft 3, i.e. at that end portion of the drive shaft 3 which is on the side of an engine room. The drive shaft 3 has a male screw 7 formed on the outer end portion thereof and a tapered surface 8 adjacent to the male screw 7.

A boss member 10 formed integrally with the central portion of a drive power transmission plate 9 is fitted around the tapered surface 8 and tightly secured thereto with a nut 11 engaged with the male screw 7.

A ratchet pawl 16 is pivotally supported on a pin 17 on the outer side of the drive power transmission plate 9, i.e. on the side opposite to the engine room. This ratchet pawl 16 is engageable with ratchet teeth 15 when the engine is started, the ratchet teeth 15 being provided on the outer circumferential surface of a flange 14 formed at one end portion of a hollow engine starting shaft 13 which is rotatably fitted at the other end portion thereof around a support shaft 12 projected from the inner surface of the casing 1 toward the drive shaft 3.

Figure 2:
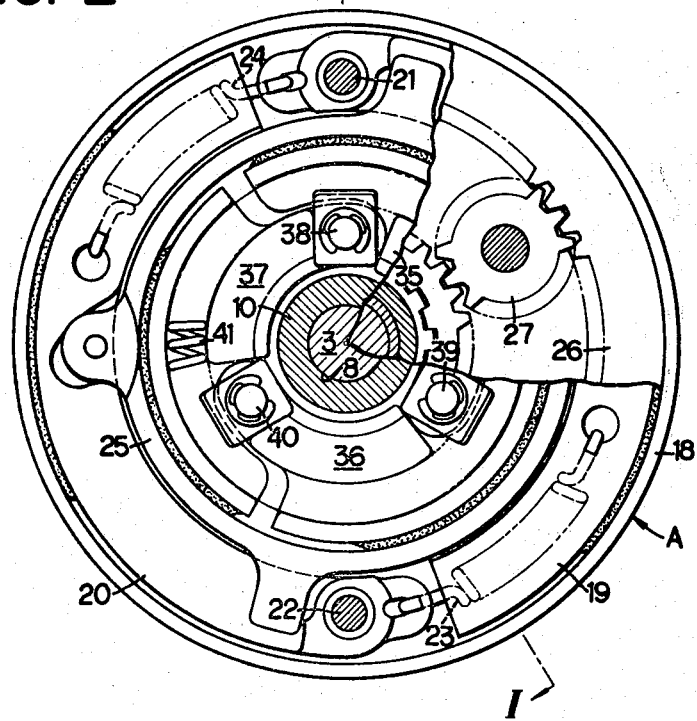
FIG. 2 is a cross-sectional view taken along the line II—II in FIG. 1.

Referring to FIGS. 1 and 2, an outer annular conductor 18 supported on another member, and a pair of inner arcuate contactors 19, 20 which constitute a wet type centrifugally operated clutch A according to the present invention and which are pivotally supported on pins 21, 22 at the respective base end portions which are in opposite positions with respect to the diameter of the outer annular contactor 18. Each of the inner arcuate contactors 19, 20 is provided with a lining on the outer circumferential surface thereof for increasing the frictional force between the outer circumferential surface of the inner arcuate contactors 19, 20 and the inner circumferential surface of the outer annular contactor 18. Tension coil springs 23, 24 are provided between the front end portion of the inner arcuate contactor 19 and the base end portion of the inner arcuate contactor 20, and between the front end portion of the inner arcuate contactor 20 and the base end portion of the inner arcuate contactor 19. Owing to these tension coil springs 23, 24, the inner arcuate contactors 19, 20, which are normally not pressed against the outer annular contactor 18, come into frictional contact with the outer annular contactor 18 due to a centrifugal force when the number of revolutions of the drive shaft 3 exceeds a predetermined level. Thus, the rotational movement of the drive shaft 3 is transmitted to the outer annular contactor 18.

At least a part of the outer annular contactor 18 and inner arcuate contactors 19, 20, which constitute the centrifugally operated clutch A is immersed in the lubricating oil in the casing 1.

A second outer annular contactor 25, which constitutes a second wet type centrifugally operated clutch, is secured to that portion of the inner surface of the drive power transmission plate 9 which is radially on the inner side than the inner arcuate contactors 19, 20. This second wet type centrifugally operated friction clutch will be described later.

Referring to FIGS. 1, 3 and 4, a ring gear 26, which constitutes a part of a planetary gear mechanism B in the present invention, is formed integrally with that end portion of the outer annular contactor 18 which is on the side of the engine room. This ring gear 26 integrally formed with the outer annular contactor 18 is engaged with three planetary gears 27, which are engaged with a sun gear 28.

Each of the planetary gears 27 carries a pair of side plates 30, 31 on both side surfaces thereof.

A planetary gear supporting pin 29, whereby each of the planetary gears 27 is supported rotatably and in a spaced relationship on a planetary gear supporting plate 32, also supports the side plate 30 such that the side plate 30 can be rotated relative to the pin 29.

The side plates 30, 31 are extended beyond the outer periphery of the planetary gear 27 and up to both side surfaces of the ring gear 26 and sun gear 28, and relatively slidably hold the ring gear 26 and sun gear 28 from both side surfaces thereof such that the side plates 30, 31 cooperate with each other so as to suppress the relative axial movements of the ring gear 26 and sun gear 28 with respect to the planetary gear 27. Each of the side plates 30 is formed circularly and provided concentrically with the planetary gear 27. The peripheral portion of the side plate 30 is bent away from the side surface of the gear 27 so that the peripheral portion of the side plate 30 has a smooth cross-sectional shape. Thus, a smooth relative sliding contact between the peripheral portion of the side plate 30 and the gear 26 is promoted.

On the other hand, the side plate 31 consists of a one-piece plate extended over the three planetary gears 27. The ring gear 26 has an axial width smaller than that of the planetary gears 27. The peripheral portion of the side plate 31 is bent so as to elastically contact the side surface of the ring gear 26. As a result, the ring gear 26 is held by the side plates 30, 31 at an increased elasticity.

A planetary gear supporting plate 32 is fixedly mounted on the outer circumferentially surface of one end portion of a hollow driven shaft 33 fitted around the drive shaft 3 via a bearing 34, and an output member or a sprocket 43 is mounted on the circumferential surface of the other end portion of the driven shaft 33 via a spline 42. The sprocket 43 is operatively connected in the casing 1 to a sprocket on the side of a drive wheel via a drive chain 44. In this case, at least a part of the drive chain 44 may be immersed in the lubricating oil in the casing 1 with or without immersing a part of the centrifugally operated clutch A in the same lubricating oil as mentioned above.

Referring to FIGS. 1 and 2, three inner arcuate contactors 35, 36, 37 are pivotally supported by pins 38, 39, 40 on that side surface of the planetary gear supporting plate 32 which is not opposed to the engine room. Linings are provided on the outer circumferential surfaces of the inner arcuate contactors 35, 36, 37 for the purpose of increasing a frictional force generated between the outer circumferential surfaces of the inner arcuate contactors 35, 36, 37 and the inner circumferential surface of the outer annular contactor 25. Each of these inner arcuate contactors 35, 36, 37 has a circumferentially extended groove, in which a coil spring 41 common to the contactors 35, 36, 37 is provided. Owing to the coil spring 41, the inner arcuate contactors 35, 36, 37, which are normally not pressed against the outer annular contactor 25, come into frictional contact therewith by a centrifugal force when the number of orbital motion of the planetary gear 27 exceeds a predetermined level, to thereby stop the relative rotations of the planetary gear 27 and drive shaft 3. At this time, the planetary gear 27 is not rotated around its own axis; the planetary gear 27 as well as drive shaft 3, inner arcuate contactor 19, outer annular contactor 18, ring gear 26, planetary gear supporting plate 32 and driven shaft 33 are rotated together with the sun gear 28.

The sun gear 28 is mounted via a spline 46 on the outer circumferential surface of one end portion of a sleeve 45 which is mounted on the driven shaft 33 such that the sleeve 45 can be rotated relative to the driven shaft 33, and a ratchet pawl supporting plate 47 is fixedly mounted on the outer circumferential surface of the other end portion of the sleeve 45.

Referring to FIGS. 1 and 5, the ratchet pawl supporting plate 47 is provided with a pair of ratchet pawls 51 which are pivotally supported thereon by pins 52. Each of the ratchet pawls 51 is adapted to be engaged with ratchet teeth 50' formed on the inner circumferential portion of an annular ratchet teeth supporting member 50 which is attached with bolts 49 to a bracket 48 projected from the inner surface of the casing 1. Each of the ratchet pawls 51 is constantly biased so as to be engaged with the ratchet teeth 50' by a spring 54 supported on a shaft 53 of the ratchet pawl supporting plate 47.

When the ratchet pawls 51 receive a rotational force exceeding a predetermined level in the same direction in which the drive shaft 3 is rotated, the ratchet pawls 51 are disengaged from the ratchet teeth 50' so as to be swung by a centrifugal force to positions illustrated by chain lines in FIG. 5, where the ratchet pawls 51 are not in contact with the ratchet teeth 50'. In other words, when the inner arcuate contactors 35, 36, 37 come into frictional contact with the outer annular contactor 25 to allow the ring gear 26, planetary gear 27, sun gear 28 and driven shaft 33 to be rotated together with the drive shaft 3, the ratchet pawls 51 are swung away from the ratchet teeth 50' to positions where the ratchet pawls 51 are not in contact with the ratchet teeth 50'. This allows the ratchet pawls and teeth 51, 50' to generate no meshing sounds therebetween when the drive shaft 3 is rotated at a high speed without reducing the speed.

Even when the sun gear 28 comes near being rotated in a direction opposite to the direction in which the drive shaft 3 is rotated, the ratchet pawls 51 safely come into engagement with the ratchet teeth 50' so that the rotation in the aforesaid direction of the sun gear 28 can be prevented.

Referring to FIG. 1, an energy storing coiled spring 55 is fastened at its one end to the outer circumferential surface of the outer end portion of the hollow, engine starting shaft 13, and at the other end thereof to the inner surface of the casing 1. An energy storing transmission chain 57 is provided between a sprocket 56, which is integrally formed on the outer circumferential surface of the hollow, engine starting shaft, and a sprocket (not shown) cooperating with an engine starting pedal (not shown). The hollow, engine starting shaft 13 is supported reinforcingly in a pressed manner by a reinforcing presser member 58.

In the above-described construction, the engine starting pedal is stepped to rotate the hollow, engine starting shaft 13 via the energy transmission chain 57 so that energy is stored in the energy storing coiled spring 55. When energy stored in the spring 55 is released at a time, a rotational force is thereby generated, which is transmitted to the engine via the hollow, engine starting shaft 13, ratchet pawl 16, drive power transmission plate 9 and drive shaft 3, to start the engine.

When the engine is started, the rotational force generated thereby is transmitted to the drive shaft 3 and drive power transmission plate 9 so that the ratchet pawl 16 is disengaged from the ratchet teeth 15 by a centrifugal force. When the number of revolutions of the engine exceeds a predetermined level, the inner arcuate contactors 19, 20 come into frictional contact with the outer annular contactor 18. As a result, the rotation of the drive shaft 3 is transmitted to the drive wheel via the outer annular contactor 18, ring gear 26, planetary gear 27, planetary gear supporting plate 32, driven shaft 33, sprocket 43 and drive chain 44. While the rotation of the drive shaft 3 is thus transmitted to the drive wheel, the ratchet pawls 51 are engaged with the ratchet teeth 50' so that the sun gear 28 is not rotated.

Since a lubricating oil is sealed in the casing 1 such that at least a part of the wet type centrifugally operated clutch A is immersed therein in a normal condition, the lubricating oil is scooped up by the clutch A as it is rotated, so as to be supplied to the planetary gear mechanism B disposed adjacent to the clutch A. Since no partition wall is provided between the clutch A and planetary gear mechanism B, nothing obstructs the flow of the lubricating oil. Namely, the lubricating oil scooped up by the clutch A can be effectively supplied to the planetary gear mechanism B.

When at least a part of the drive chain 44 is immersed in the lubricating oil in the casing 1 with or without immersing the centrifugally operated clutch A in the same lubricating oil, the oil can be scooped up by the chain 44 in accordance with the rotation of the drive chain 44 so as to be supplied to the planetary gear mechanism B disposed adjacent to the drive chain 44. Since the drive chain 44 is disposed on the opposite side of the centrifugally operated clutch A with respect to the planetary gear mechanism B, and since the ratchet pawl supporting plate 47 fixed to the sun gear is not rotated, nothing obstructs the lubricating effect of the drive chain 44 on the planetary gear mechanism. Namely, the planetary gear mechanism can be smoothly lubricated.

Figure 8:
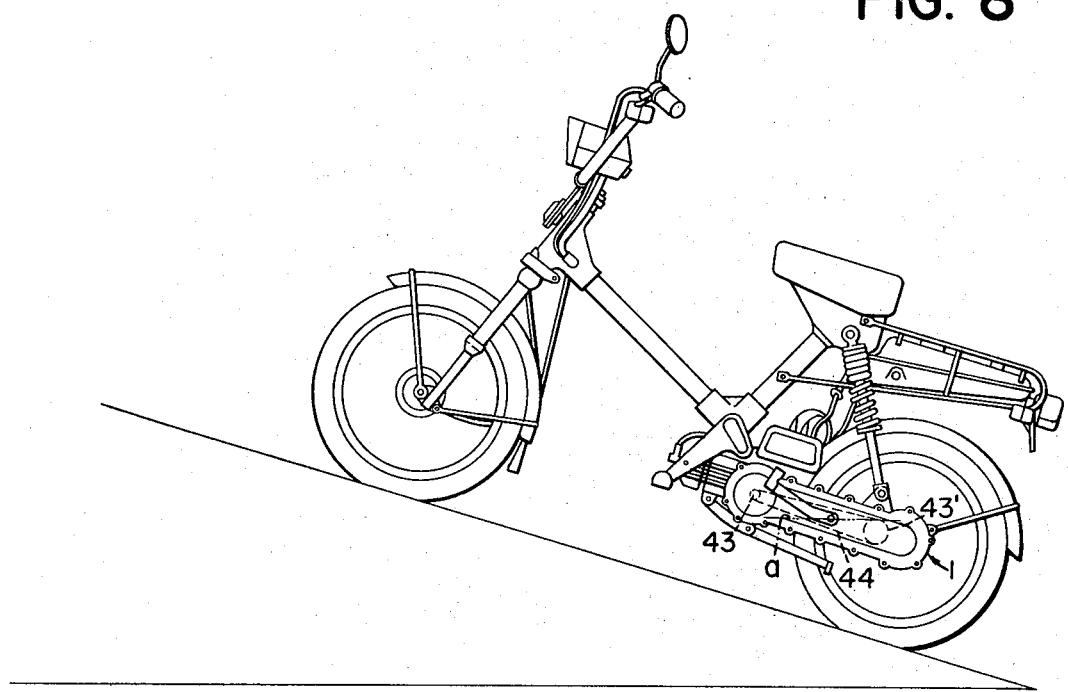
FIG. 8 is a side elevational view of a motorcycle running up a slope with a lubricating means according to the present invention applied thereto and shown in longitudinal section.

Even when the vehicle is, for example, longitudinally inclined to place the centrifugally operated clutches above the level surface a (FIG. 8) of the lubricating oil in the casing 1 as it runs up on a slope, the lubricating oil gathering unevenly in the rear portion of the interior of the casing 1 can be effectively scooped up to be supplied to the planetary gear mechanism B since the drive chain 44 is entrained around a pair of sprockets 43, 43' in the longitudinal direction in the casing 1.

When the number of revolutions of the drive shaft 3 is further increased to reach a high speed region, the inner arcuate contactors 35, 36, 37 come into frictional contact with the outer annular contactor 25 so that the ring gear 26, planetary gear 27 and sun gear 28 are rotated with the drive shaft 3 in the same direction. As a result, the ratchet pawls 51 are disengaged from the ratchet teeth 50'. Consequently, the driven shaft 33 and sprocket 43 are rotated at the same speed as the drive shaft 3, and the rotational force is transmitted to the drive wheel via the drive chain 44.

At this time, the ring gear 26, planetary gear 27 and sun gear 28 are rotated together so that the planetary gear mechanism B requires no lubricating oil in particular.

Figure 7:
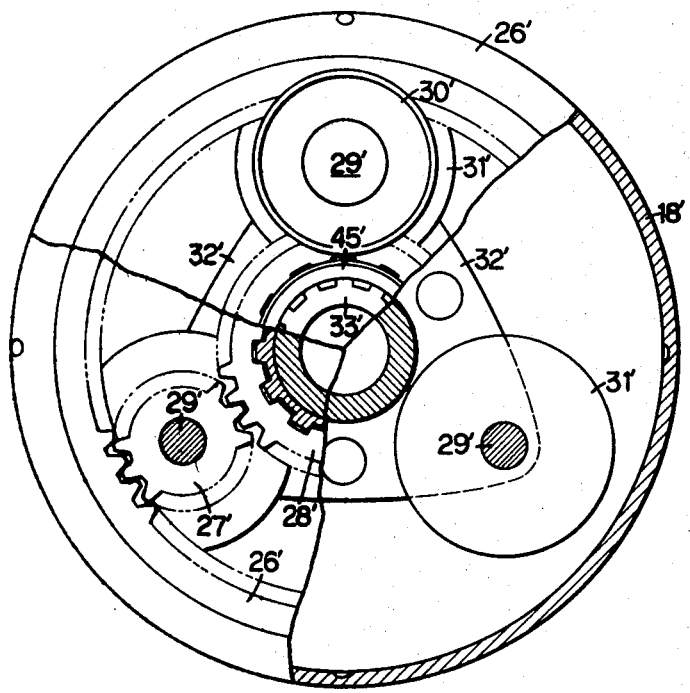
FIG. 7 is a side elevational view partially in section taken along the line VII—VII in FIG. 6.
Figure 6:
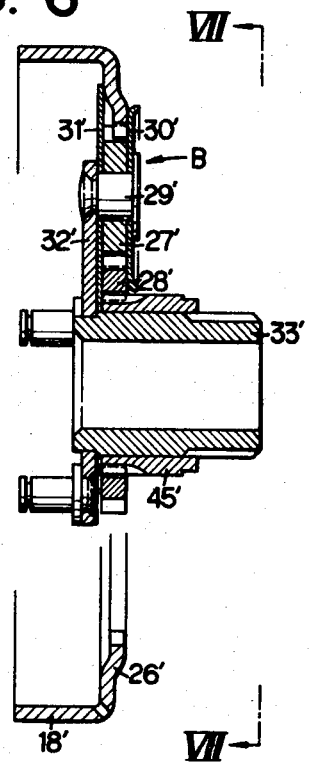
FIG. 6 is a longitudinal sectional view similar to FIG. 3 of another embodiment of the present invention.

FIGS. 6 and 7 illustrate another example of planetary gear mechanism B.

In this planetary gear mechanism, a ring gear 26' integrally formed with an outer annular contactor which constitutes a wet type centrifugally operated clutch in the present invention has an annular bent portion. A pair of side plates 30', 31' supported on planetary gears 27' pivotally connected by pins 29' to a planetary gear supporting plate 32' which is mounted on a driven shaft 33' are circularly formed and extended up to the bent portion of the ring gear 26' and the side surface of the sun gear 28' spline-connected to a sleeve 45'. The circular side plates 30', 31' can be simply formed. The ring gear 26' having an annular bent portion is held by a pair of side plates 30', 31'. Therefore, the elastic holding capability of the side plates 30', 31' can be effectively utilized.

Since the centrifugally operated clutch in the present invention, which cooperates with a planetary gear mechanism to form a power transmission passage, consists of a wet type centrifugally operated clutch, the deposition of a liquid, such as a lubricating oil on the surface of the lining material, which often occurs in a dry type centrifugally operated clutch, can be prevented. Accordingly, it is not necessary to provide a partition wall between the planetary gear mechanism and centrifugally operated clutch. The planetary gear mechanism and wet type centrifugally operated clutch are enclosed by the same casing, in which a lubricating oil is sealed in such a manner as to allow at least a part of the wet type centrifugally operated clutch and/or at least a part of a drive chain for transmitting an output of the planetary gear mechanism to a driven member to be immersed therein. Therefore, the lubricating oil is scooped up by the clutch and/or chain, while sufficiently cooling the latter, so as to be supplied to the meshing portions and bearing-contacting portions of the planetary gear mechanism. Thus, the planetary gear mechanism is lubricated and cooled. As a result, a smooth meshing of gears and a smooth contact between sliding parts are promoted. This causes an increase in power transmission efficiency and a decrease in noise level, and serves to prevent the seizure of frictional parts, the deterioration of the material, and the breakage in and wear on parts.

An automatic transmission according to the present invention does not require any special cooling means, lubricating means and noise prevention means. In fact, the present invention provides an automatic transmission of a simple construction which can be manufactured easily at a low cost.

The present invention is not, of course, limited to the above-described embodiments; it may be modified in various ways within the scope of the appended claims.

What is claimed is:

1. An automatic transmission comprising a casing containing a lubricating oil sealed therein, an input member operatively connected to a drive source so as to be rotated thereby, an output member operatively connected to a driven member, a planetary gear mechanism interposed in said casing between said input member and said output member for transmitting power from said input member to said output member, a wet type centrifugally operated clutch means cooperating with said planetary gear mechanism to form a power transmission passage for controlling power transmission between said planetary gear mechanism and said input and output members, and a drive chain transmitting power from said output member to said driven member, said drive chain being sealingly disposed in said casing at a location close to said planetary gear mechanism and having at least a part thereof immersed in the lubricating oil in said casing whereby the lubricating oil is scooped up by said drive chain in accordance with the rotation of said input member so as to be supplied to said planetary gear mechanism.

2. An automatic transmission according to claim 1, wherein said planetary gear mechanism comprises a sun gear rotatably mounted on said input member, a ring gear disposed radially outwardly of said sun gear, and planetary gears disposed between and engaged with said sun gear and said ring gear.

3. An automatic transmission according to claim 2, wherein said centrifugally operated clutch is disposed between said input member and said ring gear so that it is actuated by a centrifugal force when the rotational speed of said input member exceeds a predetermined level to connect said input member and said ring gear for integral rotation with each other.

4. An automatic transmission according to claim 3, wherein said planetary gears are connected to said output member and rotatably supported on a support member which is rotatably fitted around said input member; and said sun gear is permitted to rotate in the same direction as said input member but prevented from rotation in the reverse direction by means of a one-way clutch.

5. An automatic transmission according to claim 3 or 4, further comprising a second centrifugally operated clutch means disposed between said input member and said planetary gears, said second clutch means being actuated when the rotational speed of said input member exceeds a second predetermined level which is higher than the first predetermined level at which said first-mentioned centrifugally operated clutch means is actuated, to thereby rotate said input member and said planetary gears together.

6. An automatic transmission according to claim 1 or 2, wherein said drive chain is disposed on that side of said planetary gears which is opposite to said centrifugally operated clutch means.

* * * * *